United States Patent Office 3,382,212
Patented May 7, 1968

3,382,212
PROCESS FOR PREPARING POLYPHENYLENE ETHERS
Charles C. Price, Lansdowne, and Gerald D. Staffin, New Brunswick, Pa., assignors, by mesne assignments, to The General Tire & Rubber Company, Akron, Ohio, a corporation of Ohio
No Drawing. Continuation of application Ser. No. 820,863, June 17, 1959. This application June 6, 1966, Ser. No. 555,941
2 Claims. (Cl. 260—47)

ABSTRACT OF THE DISCLOSURE

Polyphenylene ethers (oxides) having an average molecular weight of at least 3400 are disclosed in which adjacent phenylene ether units are joined through carbon-oxygen-carbon linkages. A major amount of the phenylene nuclei of the polymer contains at least one hydrogen atom meta to the ether oxygen atom attached to each of the phenylene nuclei and, also, contains at least one radical of the class consisting of alkyl, alkenyl, alkoxy and alkenyloxy having from one to three carbon atoms attached to each of the phenylene nuclei, any carbon atom joining one of said radicals to each of the phenylene nuclei having at least one hydrogen atom attached thereto. These polymers are prepared by mixing a free radical forming compound capable of removing an electron from an aromatic oxide ion with an alkaline aqueous solution of a halogen containing phenolate ion having the above substituents, in the presence of a liquid inert organic solvent, immiscible with the aqueous phase and capable of dissolving the polymer formed, and recovering a solution of the polyphenylene ether in the organic solvent. The lowered melting and/or softening point and the improved solubility of these polymers makes them extremely useful in preparing solutions for casting purposes. Moreover, the lowered softening point permits the new polymers to be readily calendered onto fabrics such as cotton, nylon and other natural and synthetic materials to provide polymeric coated fabrics. Thus, these polymers can be used to make decorative fabrics, upholstery materials for chairs and the like, wall coverings, coated panels for automobile doors, coatings for conveyor belts, coatings for shipping containers and other materials.

---

This application is a continuation of patent application S.N. 820,863, filed June 17, 1959, now abandoned, and entitled, "Composition and Method."

This invention relates to new conjugated polymers of substituted aromatic oxides and to methods for making the same. More particularly, the present invention relates to alkyl, aryl, alkoxy, alkenyl and/or their coupled radical substituted phenylene oxide polymers exhibiting improved solubility in aromatic solvents and to methods for making the same.

Polyphenylene oxide has a high melting or softening point, for example, it is still hard at a temperature of 360° C. This limitation prevents the useful application of the polymer in many molding processes and calendering operations due to the excessive temperatures required. Further, since the polymer does not readily dissolve in many useful solvents, such as benzene, toluene and the like, it cannot readily and economically be cast as a film or used to impregnate fabrics and other materials. It would be highly desirable to be able to modify the polymer to reduce its melting point and improve its solubility, and, accordingly, it is a primary object of the present invention to provide a new poly-substituted aromatic oxide having a lowered melting or softening point and improved solubility in organic solvents.

It is another object of the present invention to provide a method for making a new poly-substituted aromatic oxide material exhibiting lowered melting and softening points and improved solubility in organic solvents.

Still another object is to provide an alkyl, aryl, alkoxy, alkenyl and/or their coupled radical substituted polyphenylene oxide soluble in organic solvents and having a relatively low softening point.

A further object is to provide a method for making an alkyl, aryl, alkoxy, alkenyl and/or their coupled radical substituted polyphenylene oxide having a relatively low softening point and being soluble in organic solvents.

These and other objects and advantages of the present invention will become more apparent to those skilled in the art from the following detailed description and examples.

According to the present invention, it has been discovered that substituted aromatic oxide polymers, for example, alkyl, aryl, alkoxy, alkenyl and their coupled radical substituted phenylene oxide polymers, are readily soluble in aromatic solvents, such as benzene, toluene and the like as well as in certain aliphatic solvents such as carbon disulfide, carbon tetrachloride, chloroform, ethylene dichloride and so forth and many of them exhibit a lowered melting or softening point, for example, below about 200 to 250° C. as compared to an unsubstituted polyaromatic or phenylene oxide which is insoluble in these solvents and which has a very much higher softening point. The lowered melting and/or softening point and the improved solubility of these polymers makes them extremely useful in preparing solutions for casting purposes such as solutions of the polymer for coating on base materials to obtain a coating on evaporation of the solvent. Moreover, the lowered softening point permits the new polymers to be readily calendered onto fabrics such as cotton, nylon and other natural and synthetic materials to provide polymeric coated fabrics. The polymers of the present invention can be used to make many useful articles such as decorative fabrics, upholstery materials for chairs and the like, wall coverings, coated panels for automobile doors, coatings for conveyor belts, coatings for shipping containers and other materials.

The polymers of this invention can also be used as a starting point or as an intermediate in the manufacture of other polymers. For example, the polymer contains generally one reactive anion radical and one reactive cation radical per molecule. For instance, where the polymer contains a bromine radical on one end and a hydroxyl radical on the other end, it can be reacted with an amine or diamine, a mono or dihydric alcohol, a silicol or polysilicol, or hydroxyl or polyhydroxyl terminated polyester, polyether, polyester ether, polyurethane or polycarbonate to chain extend the polymers. Polyester amines containing a minor amount of amino groups can also be employed. The other end of the molecule of the substituted polymer containing an OH group can then be reacted with an organic halisolane (i.e., methylchlorosilane or dichlorosilane), with a mono- or polycarboxylic acid, with a mono-, di- or other organic isocyanate to provide a urethane, or with an isocyanate terminated polyether, ester, or ether ester urethane to chain extend the polymer or to unite it to materials having a reactive H atom. The hydroxyl group can be reacted with alcohols such as polyhydric alcohols in the presence of catalysts, and other materials to chain extend the polymer. It may be reacted with ethylene oxide, propylene oxide and similar alkylene oxides, as well as the other epoxides, also to chain extend the polymer. Reaction with such materials also serves to block off the ends of the polymer or to remove the anion and cation radicals. The polymer may be crosslinked by these methods, particularly where the material with which they are reacted is branched or contains 2 or more reactive hydroxyl, isocyanate or other groups. The polymer may be cured by itself by reaction between the anion and cation radicals, usually in the presence of heat. Neutralizing agents may be added in such cases.

Where this polymer contains unsaturated side chains, it may be cured to itself or to similar polymers or to unsaturated natural and synthetic resins and rubbers such as natural rubber, polyisoprene, high styrene-butadiene resins, balata and the like with sulfur or organic sulfur furnishing compounds such as benzothiazyl disulfide and their corresponding selenides and tellurides. Accelerator systems can be used like zinc oxide, stearic acid, tuads etc. Also, where the polymer of this invention contains unsaturated side chains, the unsaturated groups can be reacted or polymerized, using conventional polymerization systems, with various other mono-, di- and poly-olefinic type materials to chain extend or crosslink the polysubstituted aromatic oxide, to increase its molecular weight, to change its solubility, or to form graft polymers of said oxide. Examples of some useful monomers for such purposes are vinyl chloride, vinylidene chloride, vinyl fluoride, styrene, methyl styrene, chlorostyrene, isobutylene, butadiene, chlorobutadiene, isoprene, divinyl benzene, trivinyl benzene, vinyl pyridine, ethylene, propylene, acrylonitrile, methacrylonitrile, chloroacrylonitrile, acrylamide, methacrylamide, acrylic acid, methacrylic acid, methyl methacrylate, ethyl acrylate, vinyl acetate, tetraethylene glycol dimethacrylate, vinyl pyrrolidone, vinyl butyl ether, linoleic acid, oleyl alcohol, and so forth and mixtures thereof.

The new polymers can be used as plasticizers by mixing them in amounts customarily used for plasticization with various resins including polyvinyl halide resins. They, also, are useful in polyether urethanes, in lubricating oils as viscosity index improvers and in many other liquid, resinous or rubbery polymers, natural or synthetic.

Substituted aromatic oxide monomers having reactive anion and cation radicals are used in the preparation of the novel polymers of the present invention. These monomers have the gentral formula:

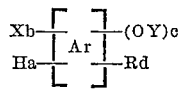

In this formula Ar is an aromatic radical, for example, a phenyl, naphthyl, anthryl, diphenyl, diphenyl alkylene, diphenyl ether, or diphenyl sulfide radical and the like, preferably having from 6 to 18 carbon atoms. Ar, also, is preferably a benzene nucleus or a phenyl radical.

X is any reactive anion radical which will readily ionize or which can readily be removed under polymerizing conditions. Examples of useful anions are chlorine, bromine and iodine radicals or a nitrate or sulfate salt radical of which bromine is preferred. Y is any reactive cation radical, also, which will readily ionize or which can readily be removed under polymerizing conditions. Some examples of useful cation radicals to employ are hydrogen, sodium, potassium, silver, and lithium radicals and the like of which hydrogen is the preferred cation to employ. O is oxygen.

R is an organic radical such as an alkyl, aryl, alkenyl, alkoxy or their coupled radical and the like and mixtures thereof. By coupled radical is meant an alkaryl, aralkyl, aryloxy, alkaryloxy, aralkoxy, aralkenyl, alkenyl aryl, alkenyloxy, aralkenyloxy, or alkenylaryloxy radical and the like and mixtures thereof. Where these organic radicals are attached through an aliphatic carbon atom to the aromatic ring (e.g. benzene and the like), they should have at least one hydrogen atom on a carbon atom alpha to the aromatic ring. R has from 1 to 18 carbon atoms, preferably from 1 to 8 carbon atoms.

H is a hydrogen atom and is attached to the aromatic ring in the meta position to the OY group. Moreover, H should not be in the ortho nor para positions to the OY group (or to the carbon atom to which OY is attached) on the same ring of the aromatic nucleus. There should be at least one hydrogen atom but not more than two hydrogen atoms in the meta positions on the same ring of the aromatic nucleus to which the OY group is attached. Thus, it is preferred that the number of hydrogen atoms vary from 1 to 2 and hence $a=1$ to 2. Where there is a naphthalene, anthracene, diphenyl or similar aromatic nucleus involved, more than two hydrogen atoms may be present on other portions of the nucleus but not on the same ring to which the OY group is attached.

While linear or substantially linear polymers are preferred, crosslinked or branch chain polymers are also desirable where greater hardness or dimensional stability is desired. This may be achieved by using monomers having more than one X and/or OY group on the aromatic nucleus. In general, there should not be more than 2 X and/or OY groups per ring of the aromatic nucleus. Preferably there is only one X and OY group per aromatic nucleus. Hence, in the above formula, $b$ can be a number from 1 to 2 and $c$ can be a number from 1 to 2.

The number of substituted organic groups, R, on the aromatic nucleus can vary widely depending on the size of the aromatic nucleus and the number of valences remaining unsatisfied after substitution by the X, OY and H radicals. For example, in a compound such as 2-bromo naphthol there can be only one R group on the same ring as the bromine and hydroxyl groups provided that there is a hydrogen in meta position to the OY radical on the same portion of the ring. On the other hand a compound such as 4-bromo phenol can have three R groups. Thus, $d$ can be a number from 1 to 3. It, however, is preferred that $d$ vary from 2 to 3.

With an aromatic radical such as phenol, the meta positions are filled with 1 or 2 hydrogen atoms while the remaining positions, ortho or para, contain at least one alkyl or other organic group, at least one anion group and the balance alkyl, anion or cation groups ortho, meta and para to the initial cation group.

Specific examples of some monomeric materials falling within the foregoing description and useful in making the polymers of the present invention are:

2,6-dimethyl-4-bromophenol;
2,6-diethyl-4-bromophenol;
2,6-diallyl-4-bromophenol;
2,3,6-trimethyl-4-bromophenol;
2,3,6-tripropyl-4-chlorophenol;
2,6-divinyl-4-iodophenol;
2,3,6-trivinyl-4-bromophenol;
2,6-dimethyl-4-chlorophenol;
2,6-hexadecyl-4-bromophenol;
2,4-dioctyl-6-bromophenol;
2-methyl-6-vinyl-4-bromophenol;
2,6-dimethyl-3-allyl-4-bromophenol;
di-4,4-(2,6-dimethyl-1-hydroxy phenyl)sulfate;
2,6-diphenyl-4-chlorophenol;
2,4-ditolyl-6-chlorophenol;
2,4-diphenyl methylene-6-bromophenol;
2,4-dipropoxy-6-bromophenol;
2,4-diphenoxy-6-bromophenol;
2,6-di(2,4-xylenoxy)-4-chlorophenol;
2,6-diphenyl carbinoxy-4-bromophenol;
2,6-diphenyl allenyl-4-bromophenol;
2,6-divinyl benzyl-4-bromophenol;
2,4-diallyloxy-6-bromophenol;
2,4-diphenylethenyloxy-6-chlorophenol;
2,4-divinyl benzoxy-6-iodophenol;

2-methyl-4-phenyl-6-bromophenol;
2-ethoxy-4-phenoxy-6-bromophenol;
2-vinyl-6-benzyl-4-bromophenol;
2-allyl-6-propoxy-4-bromophenol;
2-ethyl-4-butoxy-6-bromophenol;
2-phenyl-6-methoxy-4-chlorophenol;
2,6-dimethyl-3-allyl-4-bromophenol;
2-methyl-4,6-dibromo-1,3-benzene diol;
2,6-dimethyl-4-bromo-1,3-benzene diol;
4-methyl-2-bromo-1-naphthol;
2-methyl-4-bromo-1-naphthol;
3,3′-dibromo-4,4′-dihydroxy-5,5′-dimethyl diphenyl ether;
2,7-dimethyl-4,5-dibromo-1,8-anthracenediol;
3,3′-dibromo-4,4′-dihydroxy-5,5′-dimethyl diphenyl hexane;
3,3′-dibromo-4,4′-dihydroxy-5,5′-dimethyl biphenyl;
3-methyl-4-hydroxy-5-chlorophenyl thio benzene;

and the like and mixtures thereof. Still other organic substituted aromatic oxides having reactive anion and cation radicals can be used. Of the various monomers contemplated herein it is preferred to employ the monobromophenols having from 2 to 3 R groups as defined above but containing from 1 to 8 carbon atoms.

For purposes of illustration there are shown below the structural formulae of some typical monomers which can be used in the practice of the present invention:

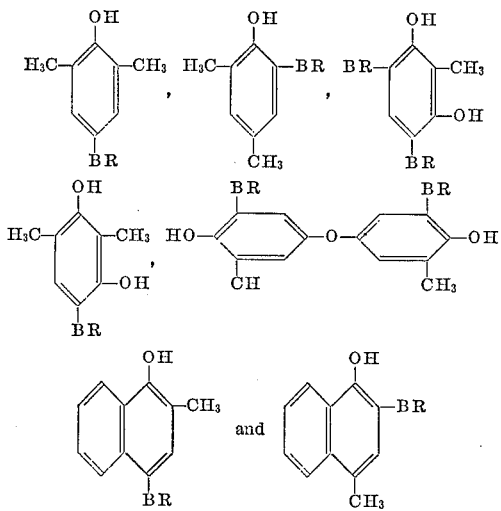

The foregoing monomers used to make the novel polymers of the present invention may readily be prepared by chlorination or bromination of an alkyl or dialkyl substituted phenol and the like.

The aromatic oxide monomer may be polymerized in solvent media, in aqueous media or mixtures thereof and by means of suspension or emulsion techniques. In liquid media, heating can be used to speed up the reaction but it will go at room temperature. Preferably, the temperature of polymerization should not go above about 200° C. On the other hand polymerization can be effected at temperatures well below room temperature. Where volatile organic solvents are employed, it is necessary to avoid excessive evaporation of the solvent or fire hazards. In such instances it may be desirable to conduct the polymerization in a closed reactor or in an autoclave and the like. Agitation of the mixture, such as stirring, is desirable as in many chemical reactions to insure better mixing of the materials. The liquid media, if used, can be benzene, toluene or other aromatic solvents, mixtures of benzene and the like with ethanol, methanol, propanol and other alcohols, water, water-acetone mixtures, water-benzene mixture etc. After polymerization, the polymer may be washed as desired to remove any salts formed. Emulsifiers, wetting agents, short-stopping agents, antioxidants and other conventional polymerization aids may be added to the system as customary in the art.

The catalyst employed should substantially be capable of removing an electron from an aromatic oxide ion such as a phenoxide ion to generate an aromaticoxy (i.e.) phenoxy, radical. Examples of useful polymerization catalysts which can be employed are iodine, light (ultraviolet) and oxygen, silver oxide, lead tetraacetate, lead dioxide, benzoyl peroxide, potassium ferricyanide and other well known catalysts.

Polymers prepared according to the teaching of the present invention have a chain of substituted aromatic units joined together by oxygen atoms. The terminal radicals are an anion and a cation attached to an oxygen atom. The aromatic units of the polymers have from 1 to 3 or more, preferably 2 to 3, organic radicals. The alkyl as well as the other substituted radicals of any aromatic unit in the polymer may be the same or may be different. Mixtures of alkyl and other substituted radicals may be on the same aromatic oxide unit of a polymer. Moreover, where a mixture of monomers having different alkyl, alkenyl or other radicals was initially employed, the resulting polymer will have recurring units of aromatic oxide radicals having different alkyl, alkenyl and other radicals. The distribution of the different aromatic oxide units in the polymer may be alternate, random or in blocked arrangement. Moreover, the various aromatic oxide units in any one polymer can have various amounts of alkyl, alkenyl and other radicals as noted above. One substituted aromatic oxide monomer may be partially or entirely polymerized and then one or more different substituted aromatic oxide monomers may be added and further polymerized. Where an unsubstituted aromatic oxide, for example 2-bromo phenol, or a fully substituted aromatic oxide, such as bromo durenol, is employed in the reaction mixture, it is used in a minor amount (mole) so that the resulting polymer has a predominating or major amount of aromatic oxide units having preferably from 2 to 3 alkyl, alkenyl and other organic radicals in order to obtain the benefits of the present invention. Furthermore, since a polymeric substance is generally a mixture of materials and since different monomers having different anion and cation radicals can be employed, the resulting polymeric substances can have a number of different anion and cation terminal radicals.

It, thus, is seen that the polymer of the present invention comprises a plurality of substituted aromatic nuclei joined together by a plurality of oxygen atoms. The polymers may be linear or branch chain or mixture thereof depending on the type and amounts of monomers employed and how they are added to the reaction mixture. A structural formula representative of one type (linear) of polymer of the present invention is shown below:

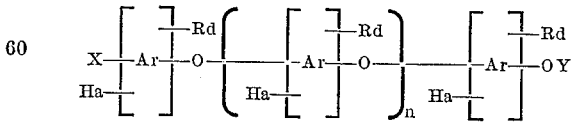

where Ar, X, Y, O, H, R and $a$ and $d$ have the designations mentioned above and where $n$ has an average value of at least 3. Using only substituted phenols having the anion X in the para or ortho positions, polymers having the following general formulae are obtained.

(A) 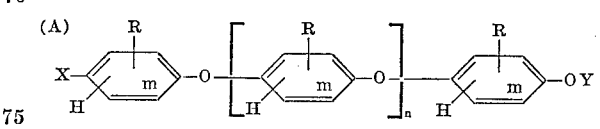

and (B) 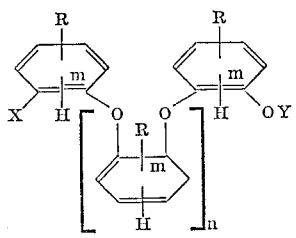

In formulae A and B above, R is an alkyl, alkenyl, alkoxy or aryl radical or coupled radical thereof as defined hereinbefore; H is hydrogen; there are from 2 to 3 R radicals and from 1 to 2 hydrogen atoms; the hydrogen atoms are meta to the $m$ position; X is an anion and Y is a cation.

Monomers containing more than one anion and one cation radicals will give crosslinked or branched polymers.

The polymers prepared according to this invention may be liquid, semi-liquid or solid. Their average molecular weights may vary from at least about 500 to 25,000 or more. These polymers can be chain extended, crosslinked or cured and so forth as described above.

The polymers of the present invention retain their plastic and/or rubbery nature even at elevated temperatures. They are stable even up to temperatures of about 300° C., showing no evidence of decomposition. At about 400° C. some of them begin to decompose.

The polymers may also be plasticized and compounded with other resins, rubbers, pigments, dyes, antioxidants, antiozonants, stabilizers and the like as well known in the plastic and rubber arts. They may be dissolved in solvents and made into paints, enamels, insulation coating compositions and other coating compositions for application as protective or decorative coatings on wood, steel, glass, cotton, nylon and the like to make various articles as disclosed above.

The following examples will serve to illustrate the invention with more particularity to those skilled in the art:

Example I.—Preparation of 2,6-dimethyl-4-bromophenol 2,6-dimethylphenol (12.2 g., 0.1 mole) was dissolved in 25 ml. of glacial acetic acid. The solution was kept at 10° C. and 16 g. bromine in 25 ml. of glacial acetic acid was added with constant stirring. After complete addition, 130 ml. of 1% sodium bisulfite was added with stirring. The 2,6-dimethyl-4-bromophenol crystallized in white needles. The product was recrystallized from petroleum ether (B.P. 75–99° C.). The product melted at 78° C. and was obtained in 72% yield (T. C. Bruice, N. Kharasch and R. J. Wizzler, J. of Org. Chem., 18, 8391 (1953)).

Example II.—Polymerization of 2,6-dimethyl-4-bromophenol 2,6-dimethyl-4-bromophenol (5.93 g.) was placed in 25 ml. of Claisen's alkali and 150 ml. of benzene was added. A crystal of iodine was introduced and the mixture was stirred for 24 hours. The benzene layer was separated from the water layer and washed with 5% hydrochloric acid, followed by water. The benzene solution was filtered into methanol and a white solid precipitated. The aqueous methanol layer was acidified with hydrochloric acid and extracted with ether. The ether was removed and the crude phenol residue weighed 5.20 g. (87.6% recovered). The weight of the polymer [poly (2,6-dimethyl phenylene oxide)] melting at 205–210° C. was 0.45 g. (12.6%). This polymer, untreated to induce crystallization, showed an amorphous X-ray diffraction pattern. The infra-red spectra showed the expected bands for poly-(dimethylphenylene oxide). The intrinsic viscosity of the polymer in benzene at 25° C. was 0.23.

PRINCIPAL ABSORPTION BANDS IN THE INFRA-RED SPECTRUM FOR POLY-(DIMETHYLPHENYLENE OXIDE) (KBr)

| Position (microns) | Intensity | Percent Transmission | Assignment |
|---|---|---|---|
| 2.85 | Weak | 72.2 | |
| 3.42 | do | 67.0 | C–H. |
| 6.25 | Medium | 38.2 | Aromatic. |
| 6.82 | Strong | 15.1 | Do. |
| 7.25 | Weak | 61.0 | Methyl. |
| 7.67 | Medium | 31.0 | Substituted aromatic. |
| 8.48 | Strong | 5.9 | |
| 9.84 | Medium | 32.0 | |
| 10.47 | Weak | 58.0 | |
| 11.22 | Medium | 43.5 | Aromatic |
| 12.07 | Weak | 59.5 | |

There is no ketone band present in the spectrum.

The following mechanisms for the reaction is believed to occur:

Initiation   $ArO^{\ominus} \xrightarrow{cat.} ArO$

Propagation

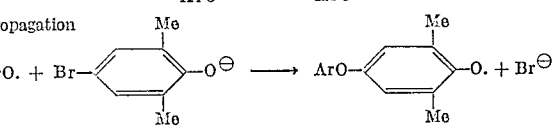

Termination   $ArO \longrightarrow ArOH$

Claisen's alkali comprises 25 g. of potassium hydroxide dissolved in 100 ml. of methanol and 25 ml. of water.

Example III.—Ultraviolet catalyzed polymerization of 2,6-dimethyl-4-bromophenol

In a flask were placed 0.81 g. of 2,6-dimethyl-4-bromophenol, 10 ml. of Claisen's alkali and 50 ml. of benzene. The contents of the flask were stirred for 19.5 hours while being illuminated with a Hanovia U.V. lamp. A 27.6% of conversion to polymer was obtained. This white polymer softened at 212°–218° C. to a tan, highly-viscous syrup.

When a reaction similar in concentrations to the above was run under nitrogen with U.V. light, only a turbidity developed when the washed benzene layer was added to methanol.

Under similar conditions to the above except that no U.V. light or iodine catalyst was used, no polymer was formed.

Example IV.—Polymerization of 2,6-dimethyl-4-bromophenol with an equivalent of iodine 2,6-dimethyl-4-bromophenol (0.61 g.) was dissolved in 12 ml. of Claisen's alkali and 0.77 g. of iodine was dissolved in 100 ml. of benzene to give a deep purple solution. The two solutions were combined and shaken in a separatory funnel. Almost instantly the benzene layer turned from purple to yellow. The aqueous methanolic layer was removed after a few minutes and the benzene layer was washed with 5% hydrochloric acid followed by water. The benzene solution was added to methanol and a precipitate formed. A 69% yield of polymer softening at 218–226° C. was obtained.

Calcd. for $C_8H_8O$: C, 79.97; H, 6.71; Br, 0.

Calcd. for:

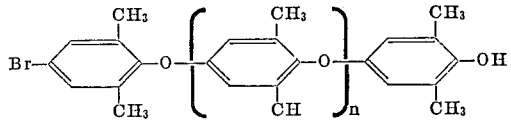

$n=10$. C, 75.71; H, 6.42; Br, 5.25. Found: C, 77.65; H, 6.92; Br, 5.30; Ash, 1.09.

The bromine analyses may include some iodine.

Example V.—Polymerizaton of 2,6-dimethyl-4-bromophenol with equivalents of base and iodine.

A solution of 0.54 g. of the phenol in an equivalent of potassium hydroxide in methanol was added to an equivalent of iodine in 100 ml. of methanol-benzene (10–90). The mixture was shaken for ½ hour. A 46% yield of polymer softening at 205° C. was obtained.

2,6-dimethyl-4-bromophenol was polymerized with an equivalent of potassium hydroxide and one tenth of a molar equivalent of iodine in benzene-methanol (90–10) for 23 hours at room temperature. An 80.9% yield of polymer, softening at 213–218° C. and becoming rubbery at 310° C. was obtained. The specific viscosity in benzene solution was $\eta=0.15$.

2,6-dimethyl-4-bromophenol was polymerized with two equivalents of potassium hydroxide and 10 mole percent iodine in benzene-methanol solution for 22 hours at room temperature. A 35.2% yield of polymer was obtained, softening point, 210–218° C. $(\eta)=0.139$. With two equivalents of base the reaction thus proceeded more slowly than with one equivalent of base.

The polymeriztaion of 2,6-dimethyl-4-bromophenol in benzene-methanol solution with 0.5 equivalent of base and 10 mole percent iodine was run for 47 hours. The yield of polymer was 12.2%, $(\eta)=0.09$.

Example VI.—Polymerization of 2,6-dimethyl-4-bromophenol with Silver Oxide

An equivalent of potassium hydroxide was added to a solution of 2.01 g. of 2,6-dimethyl-4-bromophenol in 42 ml. of benzene-methanol (90–10). Forty ml. of this solution was taken and a trace of silver oxide added. The solution turned yellow. It was shaken at room temperature for 2.5 hours. The polymer was isolated in the usual way to give a 7.5% yield, $\eta_{sp/c}=0.12$ (c.=0.908 g./100 ml. in benzene at 25° C.).

Example VII.—Lead tetraacetate catalysis 2,6-dimethyl-4-bromophenol (2.01 g.) was added to 100 ml. of benzene-methanol (90–10) containing an equivalent of potassium hydroxide. Then 0.443 g. of lead tetraacetate was added to this solution and it was shaken for twenty minutes. A 34.9% conversion to polymer melting at 195–210° C. was obtained.

Example VIII.—Polymerization of 2,6-dimethyl-4-bromophenol with potassium ferricyanide 2,6-dimethyl-4-bromophenol, 2.01 g., 0.01 moles, and 1.0 equivalent of potassium hydroxide were partitioned between 50 ml. of water and 50 ml. of benzene. Potassium ferricyanide (0.033 g.), 1 mole percent was added to the stirred mixture ($H_2O$ and $C_6H_6$ mixed solutions) at room temperature. After 114 minutes the reaction was 45% completed.

In water (using no benzene) with 1 equivalent of sodium phosphate ($Na_2HPO_4$) and 1 mole percent of potassium ferricyanide with 1 equivalent of potassium hydroxide the reaction gave a 5% conversion to polymer after 21½ hours.

When 5 mole percent of potassium ferricyanide solution was added to the above solution, 0.159 g. of polymer was isolated (13% conversion). $(\eta)=0.095$ in benzene at 30.0° C. This example shows that the polymer can be obtained, also, in aqueous media.

Example IX.—Low temperature polymerization of 2,6-dimethyl-4-bromophenol

In a flask cooled in a Dry-Ice acetone bath were placed 2.01 g. of the phenol (0.01 mole), 1.66 g. of potassium carbonate (0.012 mole), 10 mole percent of iodine, 5 ml. of methanol and 45 ml. of toluene. The contents were stirred in a closed system by an efficient stirrer. The contents turned green after one hour. The reaction was stopped after 4.5 hours. As the flask warmed to room temperature the contents turned from green to yellow. A 10.2% conversion to polymer melting at 228–235° C. was obtained, $(\eta)=0.25$ (in benzene at 30.0° C.).

A similar reaction run for 48 hours gave a conversion of 18.8%. This example shows that temperatures substantially below room temperature can be used.

Example X.—Polymerization of 2,6-dimethyl-4-bromophenol using benzoyl peroxide

To a solution of 2.55 g. of 2,6-dimethyl-4-bromophenol and 0.6 g. of alkali in 100 ml. of acetone-water (90–10) was added 1 mole percent benzoyl peroxide. The formation of polymer stopped after 20 minutes and more benzoyl peroxide was added. The polymer was not soluble in the acetone-water mix. It was obtained by filtration, redissolved in benzene and precipitated in methanol. $(\eta)=0.23$ (in benzene at 30° C.).

Example XI 2,6-diisopropyl-4-bromophenol was prepared by the bromination of 2,6-diisopropylphenol in acetic acid. The brominated phenol was distilled to give a yellow liquid.

Example XII.—Polymerization of 2,6-diisopropyl-4-bromophenol

To 50 ml. of benzene and 50 ml. of water in an Erlenmeyer flask were added 8.47 g. of 2,6-diisopropyl-4-bromophenol and 2.5 g. of potassium hydroxide. Lead dioxide (0.079 g., 1 mole percent) was added as a catalyst and the contents were stirred by a magnetic stirrer. The reaction was run for 6 days. The reaction mixture was warmed on the steam bath. The benzene was separated from the water and filtered into excess methanol. An insoluble solid was left on the filter paper. A precipitate [the poly (diisopropyl) phenylene oxide] separated from the benzene-methanol and weighed 0.1169 g.

Example XIII

Film casting.—0.3448 g. of a polymer prepared according to Example XII, above, was dissolved in 10 ml. of benzene. The solution was divided into two portions, A and B.

Portion A.—Nothing was added to the solution and the solution was poured onto a glass plate. After evaporation of solvent, a film was left which could not be removed from the plate.

Portion B.—Diphenyl ether (0.0255 g.) was added to the solution. The solution was poured onto a glass plate and, on evaporation, it left a clear film which could not be removed from the plate.

Example XIV

The method of this example was substantially the same as that of Example XII, above, except that 2,6-diallyl-4-bromophenol was used in place of the diisopropyl compound. A 10% yield of polymer, poly (diallyl) phenylene oxide, was obtained.

Example XV

Fractionation.—A large quantity of polymer was prepared for fractionation by dissolving 94.6 g. of 2,6-dimethyl-4-bromophenol in 2338 ml. of benzene and 26.4 g. of potassium hydroxide in 2338 ml. of water. These solutions were combined and stirred after the addition of 1.125 g. of lead dioxide (1 mole percent). The reaction was stopped after 45 hours. A bromide titration indicated 72% reaction; 45.6 g. of polymer was isolated (80.8%), $(\eta)=0.12$ (in benzene at 30° C.).

A solution of 45.6 g. of polymer in 2900 ml. of 1,2-dichloroethane (the solvent) was fractionated by adding nitromethane (the non-solvent), warming the solution to dissolve the polymer that had precipitated, and allowing the polymer to reprecipitate while being stirred at 30.0° C. for at least twenty-four hours. The precipitated polymer was obtain by filtration and dissolved in benzene. It was reprecipitated by filtration into six times it volume of methanol. The polymer was isolated by filtration, redissolved in benzene, and freeze dried. The fractions obtained and their weights and intrinsic viscosities are shown in Table I below:

TABLE I

| Fraction: | Weight, g. | Intrinsic Viscosity |
|---|---|---|
| 1A | 1,2470 | 0.290 |
| 1B | 2,4026 | 0.205 |
| 2 | 10.2033 | 0.200 |
| 3 | 5.1329 | 0.164 |
| 4 | 9.4244 | 0.126 |
| 5 | 6.29 | 0.114 |
| 6 | 1.90 | |
| Total | 36.600 | |

The polymer fractions were analyzed for carbon, hydrogen and bromine. The phenolic end groups were determined by titration in pyridine using tetra-butyl ammonium hydroxide in benzene-methanol (90–10) (P. C. Markunas and R. H. Cundiff, Anal. Chem., 28, 792 (1956)).

Tetrabutyl ammonium iodide was prepared by refluxing 135 ml. of tri-n-butylamine with 65 ml. of n-butyl iodide for 45 hours. The product was recrystallized three times from benzene to give 100.1 g. of tetrabutylammonium iodide; M.P. 143–4° C.

Tetrabutylammonium hydroxide in benzene-methanol (90–10) was prepared by dissolving 8 g. of tetrabutylammonium iodide in 90 ml. of methanol and shaking with 4 g. of silver oxide for one hour. The solution was filtered through a fine sintered-glass funnel and the funnel was washed with benzene. The filtrate and washings were diluted to approximately one liter.

Tht tetrabutylammonium hydroxide solution was standardized against benzoic acid in pyridine using thymol blue as an indicator. A blank was run on the pyridine. The normality of the solution was 0.02262±0.00009 N. For the determination of phenolic end groups, an accurately weighed sample of polymer was dissolved in exactly 90 ml. of pyridine and titrated with tetrabutyl-ammonium hydroxide titrant. The electrodes used in the titration were a Beckman glass electrode and a sleeve-type calomel electrode that had been modified by replacing the saturated solution of potassium chloride in water in the outer jacket by a saturated solution of potassium chloride in methanol. Millivolt readings were measured in a Beckman model GS–pH meter.

The results of the carbon, hydrogen and bromine analyses and the molecular weights calculated from these data and the molecular weights obtained by titration are listed in Table II below:

of $\eta_{sp/c}=0.141$ (c.=0.551 g./100 ml.) and prepared according to this invention is set forth in Table III below:

TABLE III.—COHESIVE ENERGY DENSITY CHARACTERIZATION OF POLYMER

| Solvent | (Cal./cc.)$^{1/2}$ | Observation at Room Temperature |
|---|---|---|
| Heptane | 7.43 | Insoluble. |
| Cyclohexane | 8.2 | Do. |
| Tetralin | 8.4 | Moderately soluble. |
| Carbon Tet. | 8.6 | Soluble. |
| Toluene | 8.9 | Do. |
| Chloroform | 9.3 | Do. |
| Methylene chloride | 9.7 | Do. |
| o-Dichlorobenzene | 10.0 | Do. |
| Carbon disulfide | 10.1 | Do. |
| Nitropropane | 10.38 | Insoluble. |
| Acrylonitrile | 10.56 | Do. |
| Benzonitrile | 11.17 | Soluble. |
| Acetonitrile | 11.9 | Insoluble. |

The above data indicate the cohesive energy density parameter of the polymer is about 9.0 (Cal./cc.)$^{1/2}$.

Example XVI 2-bromo-phenol was dissolved in a 90–10 benzene-methanol mixture containing solid potassium carbonate. The resulting composition was divided into two portions, one being treated with silvtr oxide and the other with lead tetraacetate as catalysts. No polymer was obtained in each instance after several days stirring.

In another run pentabromophenol was dissolved in an aqueous potassium hydroxide-benzene mixture containing iodine as a catalyst. No polymer was obtained after several days stirring.

This example shows that bromophenols which do not have alkyl or alkenyl substituted groups on the benzene ring do not provide polymers.

Example XVII 2,6-di-t-butyl-4-bromophenol was mixed with benzene and aqueous potassium hydroxide solution containing potassium ferricyanide. After stirring for several days, the mixture was discarded as no appreciable polymer formation had occurred.

This example demonstrates the fact that a substituted alkyl group which does not have a hydrogen atom on a carbon atom alpha to the benzene ring can block the polymerization.

Example XVIII

The method of this example was the same as Example XVII, above, except that phenol, $C_6H_5$-OH, was used in place of 2,6-di-t-butyl-4-bromophenol. No polymer was

TABLE II

| Fraction Number | 1a | 1b | 2 | 3 | 4 | 5 |
|---|---|---|---|---|---|---|
| Percent C: | | | | | | |
| Calc'd | 79.36 | 78.9 | 79.13 | 78.77 | 78.29 | 78.06 |
| Found | 79.06 | 78.45 | 78.60 | 78.66 | 78.32 | 77.71 |
| Percent H: | | | | | | |
| Calc'd | 6.37 | 6.64 | 6.65 | 6.63 | 6.60 | 6.58 |
| Found | 6.63 | 6.6 | 6.55 | 6.71 | 6.60 | 6.54 |
| Percent Br: | | | | | | |
| Calc'd | 0.76 | 1.31 | 1.04 | 1.48 | 2.08 | 2.35 |
| Found | 0.76 | 1.31 | 1.04 | 1.48 | 2.08 | 2.35 |
| Molecular weight based on Br Analysis | 10,500 | 6,100 | 7,680 | 5,400 | 3,840 | 3,400 |
| Number of units (Br) | 84.85 | 48.1 | 61.3 | 42.3 | 29.3 | 25.6 |
| Molecular weight based on titration | | 6,945 | 7,030 | 5,630 | 4,250 | 3,720 |
| Molecular wt. ratio $M_{Br}/M_{OH}$ | | 0.956 | 1.09 | 0.959 | 0.904 | 0.914 |

Structure of this polymer is:

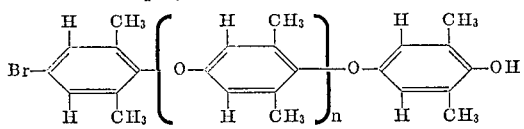

and which has one bromine and one phenolic hydroxyl per molecule.

The cohesive energy density characterization of a polymer of 2,4-dimethyl-6-bromophenol having a viscosity obtained. Thus, it is apparent that the phenol must have both anion and alkyl (or alkenyl) groups.

Example XIX

Bromo durenol (tetra-methyl bromo-phenol) was dissolved in a mixture of aqueous potassium hydroxide solution and benzene with iodine as a catalyst. After stirring for several days, the composition was discarded as a polymer had not formed. This example shows that more than 3 alkyl and/or alkenyl groups on the same benzene ring of the bromo phenol compound will not provide a polymeric material.

Example XX

Mixture (in mole ratio of 9:1) of 0.60 g. of 2,6-dimethyl-4-bromophenol and bromo durenol was dissolved in a mixture containing 12 ml. of aqueous Claisen's alkali, 0.75 g. of iodine and 100 ml. benzene and rapidly stirred for a few minutes, after which the aqueous layer of methanol was removed. The remaining benzene layer was washed with 5% HCl followed by water. The benzene solution was added to methanol whereupon the polymer precipitated and was obtained as a solid having a lowered softening point.

This example shows that while (see Example XIX) bromo durenol is not homopolymerizable, it will polymerize with a major molar amount of dialkyl substituted halogenated phenol to give polymeric substances which have lowered softening points.

EXAMPLE XXI

The method of this example was the same as Example XX above, except that 2-bromophenol was substituted for the bromo durenol. The resulting polymer had a softening point which was substantially below the softening point of unsubstituted polyphenylene oxide.

This example shows that although bromophenol does not readily homopolymerize (see Example XVI above), it will polymerize in the presence of a major amount of a dialkyl substituted halogenated phenol to give useful polymers.

EXAMPLE XXII

This example was similar to the other examples, above, except that the monomer employed was 2-phenyl-4-bromo-6-methyl phenol and the catalyst was iodine. A good yield of poly-2-phenyl-6 methyl phenylene oxide was obtained.

Although several embodiments of the invention have been hereinshown and described, it will be understood that in accordance with provisions of the patent statutes, numerous modifications of the composition and method shown may be resorted to without departing from the spirit of the invention.

What we claim is:

1. The method for the preparation of a polyphenylene ether having an average molecular weight of at least 3400 which comprises mixing a free radical forming compound selected from the group consisting of iodine, light (ultraviolet) and oxygen, silver oxide, lead tetraacetate, lead dioxide and potassium ferricyanide with an alkaline aqueous solution of at least one phenolate ion having the general formula

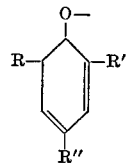

where R, R' and R'' are radicals from the class consisting of chlorine, bromine, iodine, alkenoxy, alkoxy, alkyl, and alkenyl radicals having from one to three carbon atoms inclusive, where at least one of said R, R' and R'' radicals is one of the organic radicals, and where at least one of the two radicals R' and R'' is one of said halogens, in the presence of a liquid inert organic solvent, immiscible with the aqueous phase and capable of dissolving the polymer, recovering a solution of a polyphenylene ether in said organic solvent, and recovering said polymer from said solvent.

2. The method according to claim 1 in which R'' is bromine and R and R' are selected from the group consisting of methyl and allyl radicals and mixtures thereof.

References Cited

UNITED STATES PATENTS 3,306,875  2/1967  Hay.
3,134,753  5/1964  Kwiatek.

OTHER REFERENCES

Blanchard et al.: Journal of Polymer Science, vol. 58, pages 469–490 (April 1962) [pp. 477–479 relied on] QD281P6J6.

Hay: Ibid, p. 585.

WILLIAM H. SHORT, *Primary Examiner.*

L. M. PHYNES, *Assistant Examiner.*